(12) United States Patent
Kim

(10) Patent No.: US 11,511,516 B2
(45) Date of Patent: *Nov. 29, 2022

(54) DISPLAY DEVICE USING ADHESION CONTROL LAYER

(71) Applicant: Young Su Kim, Suwon-si (KR)

(72) Inventor: Young Su Kim, Suwon-si (KR)

( * ) Notice: Subject to any disclaimer, the term of this patent is extended or adjusted under 35 U.S.C. 154(b) by 159 days.

This patent is subject to a terminal disclaimer.

(21) Appl. No.: 17/051,953

(22) PCT Filed: May 13, 2019

(86) PCT No.: PCT/KR2019/005699
§ 371 (c)(1),
(2) Date: Oct. 30, 2020

(87) PCT Pub. No.: WO2019/221460
PCT Pub. Date: Nov. 21, 2019

(65) Prior Publication Data
US 2021/0229399 A1    Jul. 29, 2021

(30) Foreign Application Priority Data

May 14, 2018  (KR) .................. 10-2018-0054648
Jul. 9, 2018   (KR) .................. 10-2018-0079134
May 9, 2019   (KR) .................. 10-2019-0054222

(51) Int. Cl.
*B32B 3/16*     (2006.01)
*B32B 7/06*     (2019.01)
(Continued)

(52) U.S. Cl.
CPC .................. *B32B 7/06* (2013.01); *B32B 3/16* (2013.01); *B32B 3/30* (2013.01); *B32B 7/14* (2013.01);
(Continued)

(58) Field of Classification Search
CPC .... B32B 3/16; B32B 3/30; B32B 7/06; B32B 7/14; B32B 2457/20; B32B 2457/202; B32B 2457/208
See application file for complete search history.

(56) References Cited

U.S. PATENT DOCUMENTS 10,696,011 B2 *  6/2020  Kim .................. G06F 3/041
11,073,924 B2 *  7/2021  Kim .................. B32B 27/308
(Continued)

FOREIGN PATENT DOCUMENTS

JP    2015184638    10/2015
KR    20100102788   9/2010
(Continued)

OTHER PUBLICATIONS

International Search Report—PCT/KR2019/005699 dated Aug. 16, 2019.

*Primary Examiner* — Elizabeth E Mulvaney
(74) *Attorney, Agent, or Firm* — Cantor Colburn LLP

(57) ABSTRACT

Provided is a display device using an adhesion control layer, which has excellent scratch-resistance, easily discharges air bubbles, allows proper attachment and detachment, and is stably attached regardless of whether a surface is flat or curved. The device comprises: an adhesive member; an adherend member to which the adhesive member is attached; a detachable layer disposed on one of the adhesive member and the adherend member; and an adhesion control layer to which the detachable layer is detachably attached and which is disposed on one of the adhesive member and the adherend member. The adhesion control layer is disposed on one surface of one of the adhesive member and the adherend member and includes a flat layer covering the whole of the surface and a pattern layer disposed on the flat (Continued)

layer, and the flat layer and the pattern layer have different adhesive forces with respect to the detachable layer.

22 Claims, 3 Drawing Sheets

(51) Int. Cl.
    *B32B 3/30*     (2006.01)
    *B32B 7/14*     (2006.01)

(52) U.S. Cl.
    CPC ... *B32B 2457/202* (2013.01); *B32B 2457/206* (2013.01)

(56) References Cited

U.S. PATENT DOCUMENTS

| | | | |
|---|---|---|---|
| 11,301,070 B2 * | 4/2022 | Kim | G06F 3/041 |
| 11,324,133 B2 * | 5/2022 | Kim | H05K 5/0017 |
| 2021/0247810 A1 * | 8/2021 | Kim | B32B 27/16 |

FOREIGN PATENT DOCUMENTS

| | | |
|---|---|---|
| KR | 20140096596 | 8/2014 |
| KR | 101574923 | 12/2015 |
| KR | 20160120436 | 10/2016 |
| KR | 20180037097 | 4/2018 |
| KR | 20180037102 | 4/2018 |
| KR | 20180037108 | 4/2018 |

\* cited by examiner (a)

(b)

(c)

(d)

(e)

(f)

DISPLAY DEVICE USING ADHESION CONTROL LAYER

TECHNICAL FIELD

The present invention relates to a display device, and more specifically, to a display device that can be attached and detached regardless of whether the display device has a curved surface or a flat surface by adjusting adhesive force using an adhesion control layer.

BACKGROUND ART

In a display device, a display such as a liquid crystal display (LCD), an organic light emitting diode (OLED), a micro LED, an electrophoresis display (EPD) or the like forms a screen. The display is diversely used in a mobile device such as a cellular phone, a smartphone, a tablet or the like, or in an information processing device such as an ATM, a kiosk or the like. The display device is employed in a portable device having various functions. In such a portable device, an adhesive member such as a protective sheet (protective film or protective glass), a window, a circuit board, a touch screen, a rear cover or the like is detachably attached to an adherend member. For example, a protective sheet, which is an adhesive member, may be detachably attached to the window of an adherend member, a window, which is an adhesive member, may be detachably attached to the touch screen of an adherend member, a touch screen, which is an adhesive member, may be detachably attached to the display of an adherend member, and a rear cover, which is an adhesive member, may be detachably attached to the display of an adherend member.

However, although protective sheets are widely used in conventional display devices, especially in mobile devices such as a cellular phone, a smartphone, a tablet, and the like, breakage of window glass reaches 20 to 30% of the shipments and emerges as a serious problem. When a window glass is broken, a lot of cost and efforts are required to replace it, and the broken window is removed and reproduced together with the expensive touch screen and display in most cases. Since the reproduction process is not automated worldwide, it is performed manually. In addition, the reproduction process has serious problems such as generating a lot of electronic wastes and performing the reproduction process in a process harmful to human bodies.

The patent of Korean Patent Registration No. 10-1574923 solves the above problem by detachably attaching a window. On the other hand, when an adhesive member, e.g., a protective sheet, is detachably attached to a curved display device with a low adhesive force, lifting and air bubbles are generated on the curved surface. When a strong adhesive force is used, it is not easy to remove the air bubbles, and it is difficult to reattach the adhesive member. In addition, when a relatively thick protective sheet is applied, a spring back phenomenon occurs.

Since foldable and rollable display devices (hereinafter, flexible display devices), which have become an issue recently, can be folded or rolled up, they are structurally fragile and easily damaged, and scratches are made easily. When the window is reproduced in a flexible display device due to the damage and scratches of the window, it is more complicated and requires more cost than reproduction of a flat, 2.5D, or curved display device, and a lot of electronic wastes is generated, and a process harmful to human bodies should be performed. Accordingly, the role and function of the protective sheet in the flexible display device are important. However, when a conventional protective sheet is used, the folding portion of a foldable display device, and the beginning, edged, and ending portions of a rollable display device are lifted, or air bubbles are generated at the portions.

When a protective sheet applied with a strong adhesive is attached to solve this problem, lifting of the protective sheet or generation of air bubbles can be reduced. However, the protective sheet with a strong adhesive is difficult to attach without air bubbles. In addition, when a scratch or damage occurs on the attached protective sheet, an additional process and cost are required to remove the protective sheet, and a lot of electronic wastes are generated and a process harmful to human bodies should be performed. When the protective sheet is forcibly removed, the flexible display device itself may be damaged. When a protective sheet of a soft material, such as the TPU disclosed in Korean Laid-opened Patent No. 2009-0021013, or an adhesive with a low adhesive force is used, it is difficult to attach and detach the protective sheet due to generation of air bubbles, and the protecting function is significantly lowered.

DISCLOSURE OF INVENTION

Technical Problem

Therefore, the present invention has been made in view of the above problems, and it is an object of the present invention to provide a display device using an adhesion control layer, which has excellent scratch resistance, easily discharges air bubbles, allows proper attachment and detachment, and is stably attached regardless of whether the surface is flat or curved.

Technical Solution

To accomplish the above object, according to one aspect of the present invention, there is provided a display device comprising: an adhesive member; an adherend member to which the adhesive member is attached; a detachable layer positioned on any one among the adhesive member and the adherend member; and an adhesion control layer positioned on any one among the adhesive member and the adherend member to detachably attach the detachable layer. At this point, the adhesion control layer is disposed on one side of any one among the adhesive member and the adherend member, and includes a flat layer covering the entire surface of the one side, and a pattern layer disposed on the flat layer, and adhesive forces of the flat layer and the pattern layer with respect to the detachable layer are different from each other.

In an example of the present invention, the adhesive member may be at least any one selected among a component constituting the display device and a protective sheet. The adherend member may be at least any one selected among a component constituting the display device and a protective sheet. The adherend member may have a flat or curved surface or a combination of these. The adherend member may be foldable, rollable or flexible.

In an example of the present invention, the flat layer and the pattern layer may be at least any one among a hard coating layer, a digital printing layer, a coating layer for adjusting a contact angle, a deposition layer, a micro-protrusion layer including micro-protrusions, and a surface modification layer. The pattern layer may include a first pattern exposing the flat layer. The pattern layer may include a second pattern positioned between the first patterns not to be in contact with the first pattern, and adhesive forces of the first and second patterns may be different from an adhesive force of the detachable layer by themselves according to their positions. The pattern layer may include a third pattern positioned between the first patterns to be in contact with the first pattern, and adhesive forces of the first and third patterns may be different from an adhesive force of the detachable layer by themselves according to their positions. The pattern layer may be configured of any one among or a combination of a first pattern exposing the flat layer, a second pattern positioned between the first patterns not to be in contact with the first pattern, and a third pattern positioned between the first patterns to be in contact with the first pattern, and the first to third patterns may have an adhesive force different from that of the detachable layer by themselves according to their positions.

In an example of the present invention, the pattern layer may be formed in a shape of a strip, a grid, an island, a fence, or a combination of these. The pattern layer may be a transparent layer, a translucent layer, or a combination of these. The pattern layer may be implemented as a character, a logo, a mark, or an image.

In an example of the present invention, the detachable layer may be a pattern shape configured of an adhesive layer and a cured layer. The detachable layer may be formed through any one among coating, sheet, and surface modification.

According to another aspect of the present invention, there is provided a display device comprising: an adhesive member; an adherend member to which the adhesive member is attached; a detachable layer positioned on any one among the adhesive member and the adherend member; and an adhesion control layer positioned on any one among the adhesive member and the adherend member to detachably attach the detachable layer. At this point, the adhesion control layer includes a pattern layer disposed on one side of any one among the adhesive member and the adherend member, and adhesive forces of the adherend member and the pattern layer with respect to the detachable layer are different from each other.

Advantageous Effects

According to a display device including an adhesion control layer of the present invention, as an adhesive member or an adherend member includes an adhesion control layer having an adjusted adhesive force, the display device has excellent scratch resistance, easily discharges air bubbles, allows proper attachment and detachment, and is stably attached regardless of whether the surface is flat or curved. In addition, the adhesive member can be easily removed and replaced as needed without a separate reproduction process.

DESCRIPTION OF SYMBOLS

Figure 1:
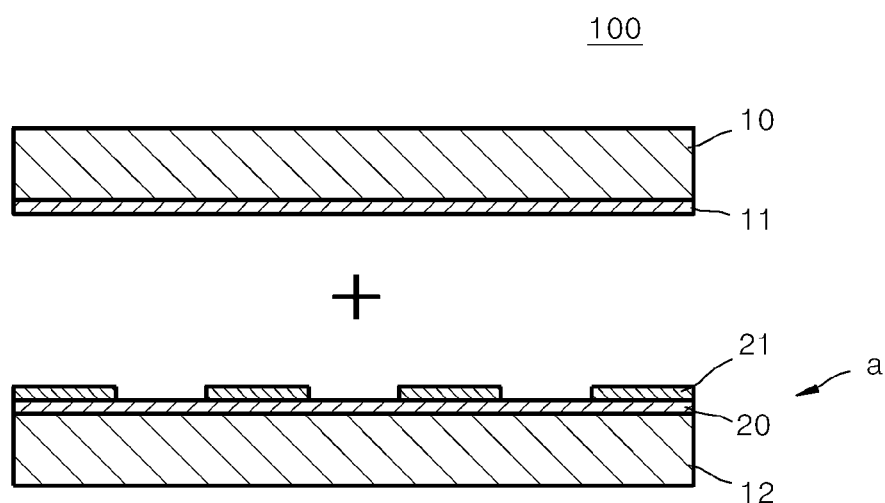
FIG. 1 is an exploded cross-sectional view showing a first display device according to the present invention.

| | |
|---|---|
| 10: Adhesive member | 11: Detachable layer |
| 12: Adherend member | 20: Flat layer |
| 21, 22, 23: First to third patterns | |
| a, b, c, d: Adhesion control layer | |
| 100, 200, 300, 400: First to fourth display devices | |

BEST MODE FOR CARRYING OUT THE INVENTION

Hereinafter, preferred embodiments of the present invention will be described in detail with reference to the accompanying drawings. The embodiments described below may be modified in various forms, and the scope of the present invention is not limited to the embodiments described below. The embodiments of the present invention are provided to more completely describe the present invention to those skilled in the art. Meanwhile, in the drawings, the thicknesses of films (layers, patterns) and regions may be exaggerated for clarity. In addition, when it is mentioned that a film (layer, pattern) is on the top, bottom, or one side of another film (layer, pattern), it may be formed directly on another film (layer, pattern), or another film (layer, pattern) may be interposed therebetween.

In an embodiment of the present invention, as an adhesive member or an adherend member includes an adhesion control layer having an adjusted adhesive force, there is provided a display device which has excellent scratch resistance, easily discharges air bubbles, allows proper attachment and detachment, and is stably attached regardless of whether the surface is flat or curved. To this end, the structure of the adhesion control layer will be described in detail, and a process of adjusting the adhesive force of the adherend member through the adhesion control layer will be described in detail.

The display device applied to the embodiments of the present invention refers to all image processing devices such as mobile devices, information processing terminals, televisions and the like. The mobile devices include cellular phones, smart phones, tablets, and the like, and the information processing terminals include ATMs, kiosks and the like. The display device may include flat or flat and curved display devices, or may be flexible. The image processing device essentially includes a window, a touch screen, and a display. The window generally refers to a window of a mobile device, a window of an information processing terminal, and a window of all image processing devices such as a television and the like. Similarly, the touch screen and the display also refer to a touch screen and a display applied to all image processing devices.

The display device is shaped in a flat surface, a curved surface, or a mixture of these. Depending on the shape of a window, the display devices have been developed into 2D display devices (flat surface), 2.5D display devices (curved front edges, flat rear side), and 3D display devices (curved surface and edges). Recently, foldable display devices that can be folded or unfolded and rollable display devices capable of winding are emerging. The foldable and rollable display devices are a kind of flexible display devices. A display device applied to an embodiment of the present invention includes a flat surface, a curved surface, or a mixture of these, such as 2D, 2.5D, 3D, and flexible display devices.

The display device of the present invention basically includes a display, a touch screen, and a window, and a touch screen cover layer may be attached to the touch screen. In addition, a polarizing film may perform the function of the touch screen cover layer, and a rear cover may be attached on the opposite side of the window for the display. Accordingly, the elements constituting the display device of the present invention essentially include a display, a touch screen, and a window, and may optionally include at least any one element among a touch screen cover layer, a polarizing film, and a rear cover. Of course, additional elements, such as a printing film, may be further added to the display device within the scope of the present invention. In this way, the display, the touch screen, the window, the touch screen cover layer, the polarizing film, the rear cover, and other additional elements are generally referred to as constitutional components constituting the display device.

A protective sheet is a protective film made of a polymer film, a protective glass using tempered glass, or a combination of these. The protective sheet is attached to the window of the display device to prevent the window from being damaged or scratched. Accordingly, the protective sheet is an additional element added to the display device.

FIG. 1 is an exploded cross-sectional view showing a first display device 100 according to an embodiment of the present invention. However, it does not show a drawing of a strict meaning, and there may be constitutional components not shown in the drawing for convenience of description.

According to FIG. 1, the first display device 100 largely includes an adhesive member 10 and an adherend member 12, and the adhesive member 10 is attached to the adherend member 12. The adhesive member 10 is at least any one selected among constitutional components and a protective sheet, in which the constitutional components constitute a display device including a rear cover, a window, a window printed or coated on the rear side, a window with a polarizing film assembled on the rear side, a window with a touch screen and a polarizing film assembled on the rear side, and other additional components. The rear cover is disposed on the opposite side of the window to protect the display, and a material such as transparent tempered glass, opaque plastic or the like is applied. The adherend member 12 is at least any one selected among constitutional components and a protective sheet, in which the constitutional components constitute a display device including a window, the rear side of a display device without a rear cover, a polarizing film cover layer, a polarizing film, a touch screen cover layer, a touch screen, a display, or any one or more of these, and a display device including other additional elements.

A detachable layer 11 formed by coating, sheet or surface modification is provided on one side of the adhesive member 10, and an adhesion control layer (a) is provided on one side of the adherend member 12 to face the detachable layer 11. For example, the detachable layer 11 of a protective sheet, i.e., the adhesive member 10, may be detachably attached to the adhesion control layer (a) on a window, i.e., the adherend member 12, the detachable layer 11 of a window, i.e., the adhesive member 10, may be detachably attached to the adhesion control layer (a) of a touch screen, i.e., the adherend member 12, the detachable layer 11 of a touch screen, i.e., the adhesive member 10, may be detachably attached to the adhesion control layer (a) of a display, i.e., the adherend member 12, and the detachable layer 11 of a rear cover, i.e., the adhesive member 10, may be detachably attached to the adhesion control layer (a) of a display, i.e., the adherend member 12. In some cases, in a display device, the detachable layer 11 and the adhesion control layer (a) may be positioned on a plurality of constitutional components such as a protective sheet and a window, which are adhesive member 10.

The protective sheet includes a transparent substrate, and when the transparent substrate is made of tempered glass, a shatterproof film for preventing scattering of the tempered glass is provided. A transparent material may be used for the transparent substrate of the protective sheet and the window without limit. For example, it may include a glass substrate or a plastic substrate. Specifically, the glass substrate may be tempered glass, and the plastic substrate may include any one or any one or more among polyethylene terephthalate (PET), polyethylene naphthalate (PEN), polyether sulfone (PES), polyimide (PI), polyarylate (PAR), polycarbonate (PC), polymethyl methacrylate (PMMA), and cycloolefin copolymer (COC). The window may also be a stacked structure in which tempered glass and a plastic substrate are formed in multiple layers.

The window may be transparent or may have a printing layer that implements various functions. The printing layer may be applied with any one or any one or more of coatings such as transparent, translucent, and color coatings. The printing layer may be formed by using silk printing, inkjet printing using UV, inkjet printing using thermal curing, or transfer printing. A functional coating layer having such characteristics as shielding, antireflection, blocking blue light, blocking electromagnetic waves, privacy and the like may be formed on the transparent substrate and the window. The functional coating layer may be formed by wet coating of applying a coating solution or dry coating such as vapor deposition.

The touch screen has a conductive pattern formed on one side or both sides of an insulating layer made of metal oxide or plastic. The conductive pattern is mainly applied with metal oxide, and the metal oxide includes ITO, ATO, ZnO, or the like, or Cu, a conductive polymer, a silver nanowire, or the like. The touch screen cover layer protects the touch screen from being damaged by impact or contamination. A transparent material may be used for the cover layer without limit. For example, the cover layer may include a glass substrate or a plastic substrate. Specifically, the glass substrate may be tempered glass or non-tempered glass, and in addition, the plastic substrate may include any one or more among polyethylene terephthalate (PET), polyethylene naphthalate (PEN), polyether sulfone (PES), polyimide (PI), polyarylate (PAR), polycarbonate (PC), polymethyl methacrylate (PMMA), and cycloolefin copolymer (COC). The plastic substrate is more preferable. The thickness of the cover layer is sufficient as long as the touch screen is not damaged in the process of using the first display device 100.

The polarizing film is a film having a property capable of separately passing or blocking vertically or horizontally polarized waves of incident light. It is an optical film used for a thin film transistor liquid crystal display (TFT-LCD) of a notebook computer, a monitor or the like, a filter for special effects of a camera, stereoscopic glasses, OLED visibility improvement and the like. For example, although the intensity of light emitted from the backlight of a liquid crystal display (LCD) module is uniform in all directions, the polarizing film transmits only the light vibrating in the same direction as the polarization axis among the light emitted from the backlight, and absorbs or reflects the other light to generate polarized light of a specific direction. When the polarized light passes through the LCD, brightness of pixels changes as the arrangement direction of the liquid crystal is electrically adjusted for each pixel.

The display includes a liquid crystal display (LCD), a light emitting diode (LED), an organic light emitting diode (OLED), a micro LED, an electrophoretic display device (EPD), and the like, and quantum dots are also used. The rear cover is disposed on the opposite side of the window to protect the display, and a material such as transparent tempered glass, opaque plastic or the like may be used.

The detachable layer 11 is provided on the adhesive member 10, and the adhesion control layer (a) according to an embodiment of the present invention is provided on the adherend member 12. Although not shown in the drawing, positions of the detachable layer 11 and the adhesion control layer (a) are interchangeable. Although the detachable layer 11 may be used in various ways within the technical scope of the present invention, it may be implemented through coating, sheet, and surface modification. In the case of coating, it is preferable to apply a thermosetting resin which is an acrylic polymer, a silicon polymer, or a urethane polymer, an adhesive prepared by mixing a thermosetting resin and UV-a curable resin with a crosslinking agent, a mixture of these, or a copolymer thereof. In some cases, the physical property of the detachable layer 11 may be improved by mixing a functional material such as silica gel, nanoparticles, and antistatic agent in the detachable layer 11. Furthermore, the optical property may be improved by adding particles forming quantum dots in the detachable layer 11.

The detachable layer 11 may be implemented in the form of a sheet rather than a coating. For example, there is an acrylic polymer compound used in an adhesive composition for a touch panel having a resin acid value of 0.1 mgKOH/g or less and a permittivity of 3-6, which is prepared by copolymerizing a monomer component including (a) a (meth)acrylic acid ester monomer having a hydrocarbon group of 1 to 12 carbon atoms, (b) a (meth)acrylic acid ester monomer containing a hydroxyl group, (c) a monomer having an amide group, and (d) a vinyl ester monomer. In addition, there is a light-transmitting pressure-sensitive adhesive sheet and a cross-linked silicon type adhesive sheet, which are silicone gel.

The detachable layer 11 may be a sheet made of an adhesive composition containing an acrylic polymer of a specific molecular weight, which does not contain an acid component containing alkoxyalkyl acrylate as a main monomer, and a crosslinking agent, or may be a transparent adhesive sheet containing 65 to 85 mass % of (meth)acrylic resin, 10 to 30 mass % of polyoxyalkylene polyol, 1.0 to 5.0 mass % of polyisocyanate, 0.005 to 0.1 mass % of tin catalyst at a solid content ratio, and having an acid value of 0 to 5 mgKOH/g, in which (A) the weight average molecular weight of (meth)acrylic resin is 100,000 to 600,000, and (B) the number average molecular weight of polyoxyalkylene polyol is 500 to 1500. Furthermore, a hydrogel type sheet is possible.

The detachable layer 11 may be formed by surface modification. The surface modification is changing the adhesive force on the surface of a transparent polymer film to 0.1 to 500 gf/25 mm through plasma treatment, corona treatment, or continuous treatment thereof on the surface of the transparent polymer film. Here, it is preferably to perform the plasma treatment after the corona treatment in the continuous treatment. At this point, the polymer film may contain any one or one or more among, for example, polyethylene terephthalate (PET), polyethylene naphthalate (PEN), polyether sulfone (PES), polyimide (PI), polyarylate (PAR), polycarbonate (PC), polymethyl methacrylate (PMMA), and cycloolefin copolymer (COC).

In the case of the plasma treatment, a plasma method such as atmospheric pressure plasma, reduced pressure plasma, corona plasma or the like is used. That is, in order to improve the adhesive force of the polymer film, the surface is chemically cleaned, and organic substances on the surface are removed by chemical and physical reactions while activating the surface. The polymer film that has gone through the plasma treatment changes the chemical bond in an area within a few μm from the surface using high energy of ions or electrons. In addition, a predetermined thickness of the surface is cut off to increase the contact angle. The surface of the polymer film is chemically or physically activated to react well with other materials. In the plasma-treated surface modification, modifications including surface cleaning such as removing fine foreign substances, change of surface roughness, and formation of polar functional groups are performed.

In the case of the corona treatment, the adhesive force of the surface of the polymer film to be treated is improved by using a corona discharge technique. When the polymer film goes through the corona treatment, charged particles in the corona collide with the surface of the film, and the surface of the film is oxidized. Accordingly, as the surface energy of the film is increased by polar groups, such as $C=O$, COH, COOH, —COO—, —CO— and the like, generated by surface oxidation, the affinity with the conductive polymer material is improved, and the adhesion of the film is improved. In addition, since a crosslink structure is formed between polymer molecules by the corona treatment, in addition to the chemical polar groups described above, the adhesion may be improved. The corona surface treatment is generally performed by placing a polymer film between both electrodes where corona discharge occurs and generating corona discharge by supplying predetermined power to the both electrodes, and surface modification of improving the adhesive force on the surface to 0.1 to 500 gf/25 mm is accomplished.

When the adhesive force of the detachable layer 11 is about 0.1 to 500 gf/25 mm, the detachable layer 11 has a self-adhesive force. The self-adhesive force is a property of the detachable layer 11 adhering by itself without air bubbles only by placing the detachable layer 11 on the adhesion control layer (a). Meanwhile, when the adhesion control layer (a) is applied, the detachable layer 11 has a more improved self-adhesive force than without the adhesion control layer (a). The adhesive force according to an embodiment of the present invention may vary according to the presence of the adhesion control layer (a). The adhesive force is 0.5 to 500 gf/25 mm when the adhesion control layer (a) exists, and the adhesive force is 0.1 to 200 gf/25 mm when the adhesion control layer (a) does not exist. When there is an adhesion control layer (a) in the case where a detachable layer 11 of the same material and thickness is provided, it is easier to attach the detachable layer 11 without air bubbles. In addition, owing to the influence of the adhesion control layer (a), separation of the detachable layer 11 occurs relatively easily.

The detachable layer 11 may also be provided in the form of a pattern. The detachable layer 11 of a pattern shape includes an adhesive layer and a cured layer, and the area of the adhesive layer occupied in the detachable pattern is 5 to 95%. In other words, as the pattern of the detachable layer 11, the adhesive layer and the cured layer exist in the form of a pattern. The adhesive layer may be cured by heat or ultraviolet light. In the adhesive layer and the cured layer, at least any one among a strip shape, a grid shape, an island shape, and a fence shape may be patterned in a rectangular shape, a wave shape, or a combination these.

As the detachable layer 11 is attached with an adhesive force of A, and the adhesive force of the detachable layer 11 becomes B by the heat and ultraviolet curing, the detachable layer 11 may be easily removed as needed. The adhesive forces A and B of the detachable layer 11 may have a difference of 50 g/inch or more.

The adhesion control layer (a) is formed on the entire surface of one side of the adherend member 12. In the adhesion control layer (a), a flat layer 20 and a first pattern 21 are sequentially stacked. The flat layer 20 is formed on the entire surface of the adherend 12 without forming a pattern. The first pattern 21 exposes the flat layer 20. The flat layer 20 and the first pattern 21 may be diversely modified to adjust the adhesive force with respect to the detachable layer 11. However, the flat layer 20 and the first pattern 21 have different adhesive forces with respect to the detachable layer 11. In other words, the adhesive force of the flat layer 20 is higher or lower than that of the first pattern 21.

The flat layer 20 and the first pattern 21 may be any one among a hard coating layer, a digital printing layer, a coating layer for controlling a contact angle, a deposition layer, a micro-protrusion layer having micro protrusions, and a surface modification layer. The cured layer may be a thermosetting hard coating layer or an ultraviolet curing hard coating layer. The thermosetting hard coating layer may be diversely selected within the scope of the present invention. For example, there are an acrylic resin containing a hydroxyl group, an acrylic resin having a hydroxyl group and a weight average molecular weight of 100,000 to 1,000,000, a resin composition containing blocked isocyanate as a main component, a composition containing an acrylic resin containing hydroxyl group and blocked isocyanate as essential components, a compound having two or more functional groups capable of reacting with an isocyanate group in one molecule, and a composition including blocked isocyanate.

The ultraviolet curing hard coating layer is formed by, for example, mixing various acrylic monomers and an ultraviolet curing catalyst with a polyurethane resin, an epoxy resin, or a polyester resin. As a specific example of a curing material cured by ultraviolet light, a urethane or acrylate oligomer, a reactive monomer, a photoinitiator, and a leveling agent are mixed as an ultraviolet reactive coating material. The urethane or acrylate oligomer contains an aliphatic, cycloaliphatic or aromatic compound, or an oligomer of these compounds, and has a chemical formula in which polyester polyol or polyether polyol is contained in the molecular structure. As the reactive monomer, trimethylpropane triacrylate, hexanediol diacrylate, pentaerythrol triacrylate, and dipentaarithyrol hexaacrylate are mixed and adjusted at an appropriate ratio considering the hardness and the adhesive force. As the photoinitiator, a general polymerization initiator activated by ultraviolet light is used, and in particular, hydroxycyclohexylphenyl ketone, benzophenol, and phenyl-2-hydroxy-2-phenylketone are mainly used.

The digital printing layer is a layer printed in a digit method. The coating layer that adjusts the contact angle may be coated with an organosilicon compound as an example of a coating that increases the adhesive force by decreasing the contact angle. As an example of a coating that lowers the adhesive force by increasing the contact angle, anti-fingerprint, anti-contamination, and slip property are provided, and the coating layer may be formed by coating a fluorine-based resin, a silicon-based resin, or a mixture of these on the deposited adherend member 12, after depositing titania (TiO2) or silica (SiO2) on the adherend member 12. At this point, the fluorine-based resin or the silicon-based resin may be formed in an easy cleaning coating (ECC) method.

The deposition layer may be configured of a single layer or a plurality of layers made of any one among gold (Au), silver (Ag), platinum (Pt), silicon (Si), copper (Cu), palladium (Pd), nickel (Ni), tungsten (W), iron (Fe), cobalt (Co), titanium (Ti), chromium (Cr), manganese (Mn), zinc (Zn), zirconium (Zr), molybdenum (Mo), iridium (Ir), ruthenium (Ru), tantalum (Ta), an alloy of these, and an oxide thereof. The deposition layer increases the adhesive force with respect to the detachable layer 11. The adhesive force of the deposition layer may be adjusted by the size and the shape of the pattern. The smaller the size and the shape of the pattern, the greater the adhesive force is.

For example, the micro-protrusion layer may be formed to have a cross section shaped in any one selected among a square shape, a triangular shape, and a circular shape, or may be made of a bead or a bead and a binder. That is, the cross section of the micro-protrusion layer may have an angle or form a curvature, or may be a combination of these. As the micro-protrusion layer is translucent, transmittance of light is lowered. Since the detachable layer 11 digs into the micro-protrusion layer, the bonding force of the detachable layer 11 is increased. In the surface modification layer, surface modification increases the adhesive force with respect to the detachable layer 11 through plasma or corona treatment or continuous treatment thereof on the surface of the transparent polymer film.

Figure 2:
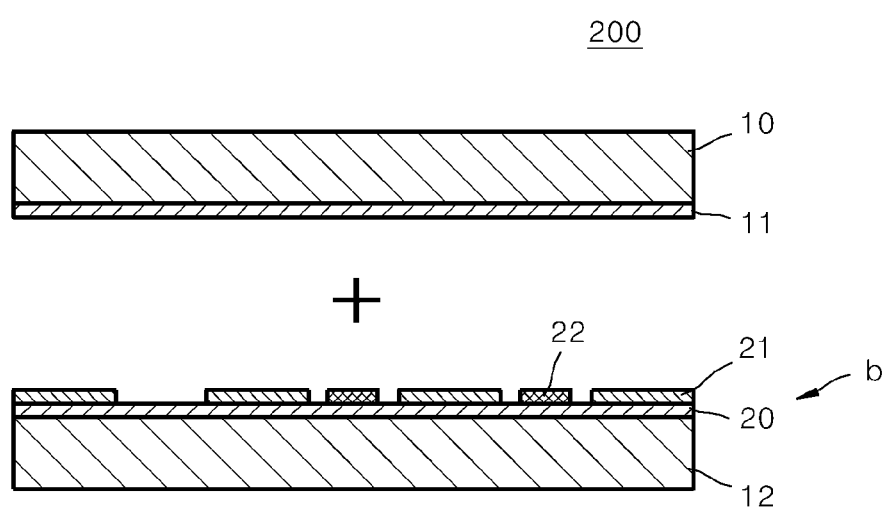
FIG. 2 is an exploded cross-sectional view showing a second display device according to the present invention.

FIG. 2 is an exploded cross-sectional view showing a second display device 200 forming a flat surface according to an embodiment of the present invention. The second display device 200 is the same as the first display device 100 except the adhesion control layer (b). Accordingly, detailed description of the same reference numerals will be omitted.

According to FIG. 2, the second display device 200 includes a flat layer 20, a first pattern 21, and a second pattern 22. The second pattern 22 is positioned between the first patterns 21, and the first and second patterns 21 and 22 are placed on the flat layer 20. The flat layer 20 and the first and second patterns 21 and 22 may be any one among a hard coating layer, a coating layer for adjusting the contact angle, a deposition layer, a micro-protrusion layer including micro-protrusions, and a surface modification layer as described in the first display device 100. The adhesive forces of the flat layer 20 and the first and second patterns 21 and 22 are different from each other with respect to the detachable layer 11. In other words, the flat layer 20 has an adhesive force higher or lower than those of the first and second patterns 21 and 22, and the first pattern 21 has an adhesive force higher or lower than that of the second pattern 22.

Figure 3:
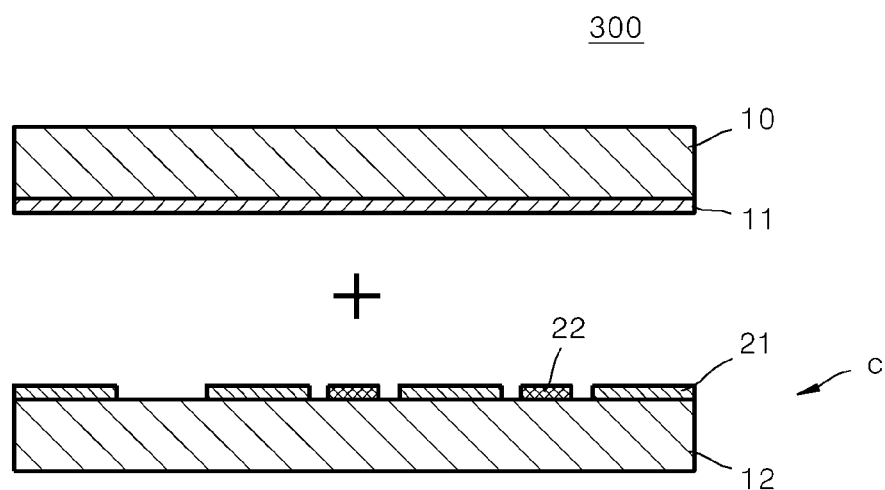
FIG. 3 is an exploded cross-sectional view showing a third display device according to the present invention.

FIG. 3 is an exploded cross-sectional view showing a third display device 300 forming a flat surface according to an embodiment of the present invention. The third display device 300 is the same as the first display device 100 except the adhesion control layer (c). Accordingly, detailed description of the same reference numerals will be omitted.

According to FIG. 3, the third display device 300 does not include a flat layer 20 and includes a first pattern 21. A second pattern 22 is positioned between the first patterns 21 to be separated from the first pattern 21. The first and second patterns 21 and 22 may be any one among a hard coating layer, a coating layer for adjusting the contact angle, a deposition layer, a micro-protrusion layer including micro-protrusions, and a surface modification layer as described in the first display device 100. The first and second patterns 21 and 22 respectively have a different adhesive force with respect to the detachable layer 11. In other words, the first pattern 21 has an adhesive force higher or lower than that of the second pattern 22. When it is needed, the adhesion control layer (c) of the third display device 300 may be formed of only the first pattern 21 without the second pattern 22.

Figure 4:
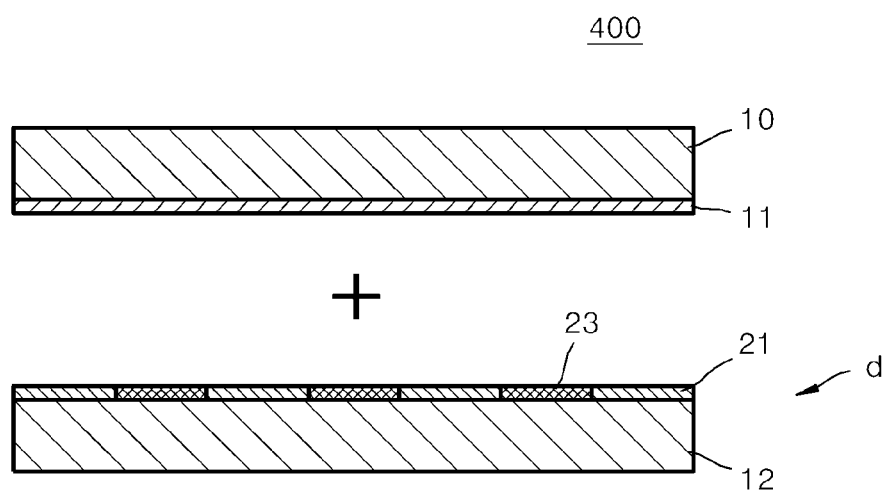
FIG. 4 is an exploded cross-sectional view showing a fourth display device according to the present invention.

FIG. 4 is an exploded cross-sectional view showing a fourth display device 400 forming a flat surface according to an embodiment of the present invention. The fourth display device 400 is the same as the first display device 100 except the adhesion control layer (d). Accordingly, detailed description of the same reference numerals will be omitted.

According to FIG. 4, the fourth display device 400 does not include a flat layer 20 and includes first and third patterns 21 and 23. The third pattern 23 is positioned between the first patterns 21 to be in contact with the first pattern 21. The first and third patterns 21 and 23 may be any one among a hard coating layer, a coating layer for adjusting the contact angle, a deposition layer, a micro-protrusion layer including micro-protrusions, and a surface modification layer as described in the first display device 100. The first and third patterns 21 and 23 respectively have a different adhesive force with respect to the detachable layer 11. In other words, the first pattern 21 has an adhesive force higher or lower than that of the third pattern 23.

The flat layer 20 and the first to third patterns 21, 22 and 23 described above are conceptually expressed. The flat layer 20 and the first to third patterns 21, 22 and 23 are presented as an example within the scope of the present invention showing that the adhesive forces are different from each other. The adhesion control layer according to the embodiment of the present invention may combine at least any one selected among the first pattern 21, the second pattern 22, and the third pattern 23 in the case where the flat layer 20 is provided or not. The adhesive forces of the flat layer 20 and the first to third patterns 21, 22 and 23, the shapes of the first to third patterns 21, 22 and 23, and the proportions occupied by the first to third patterns 21, 22 and 23 vary according to the shape and the area of the display device, the material and the surface condition of the outer layer, the material, the size and the thickness of the adhesive member 10, the material, the size and the thickness of the adherend member 12, the adhesive force of the detachable layer 11, the materials of the adhesion control layer (a, b, c, d), the adhesive forces of the adhesion control layer (a, b, c, d), and the like.

The first to third patterns 21, 22 and 23 are components constituting the pattern layer, and are classified according to their shapes. Specifically, the first pattern is a pattern exposing the flat layer 20 or the adherend member 12, the second pattern 22 is provided between the first patterns 21 without contacting the first patterns 21, and the third pattern 23 is provided between the first patterns 21 while contacting the first pattern 21. In addition, the first to third patterns 21, 22 and 23 themselves may have adhesive forces different from each other. For example, the first pattern 21 may have a different adhesive force by itself depending on the position. Adjustment of the adhesive forces varies according to the shape and the area of the display device, the material and the surface condition of the outer layer, the material, the size and the thickness of the adhesive member 10, the material, the size and the thickness of the adherend member 12, the adhesive force of detachable layer 11, the materials of the adhesion control layer (a, b, c, d), the adhesive forces of the adhesion control layer (a, b, c, d), and the like.

The pattern layer may be a transparent layer, a translucent layer, or a combination of these. The translucent layer may express a color and may have different transparency according to a pattern or a location. The pattern layer may be implemented in a form such as a character, a logo, a mark, or an image. The translucent layer may be implemented by any one or any one or more methods among vacuum deposition, digital printing, laser marking, etching, and plating.

Figure 5:
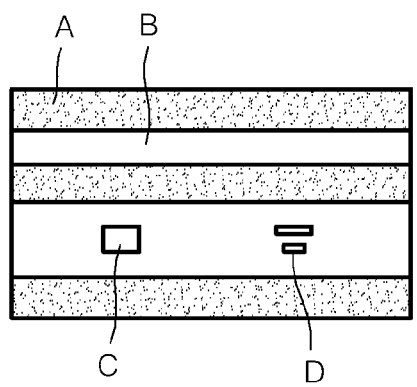
FIG. 5 shows plan views presenting examples of adhesion control layers applied to display devices according to the present invention.
Figure 5:
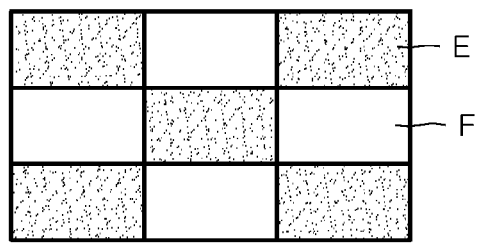
Figure 5:
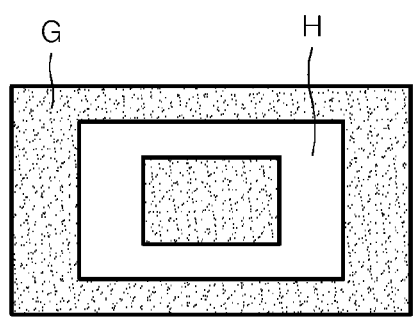
Figure 5:
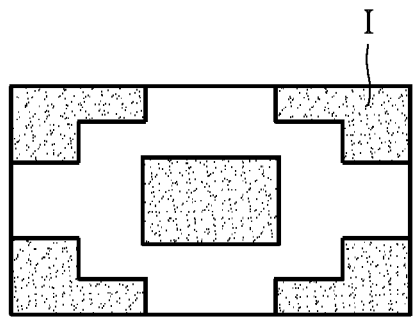
Figure 5:
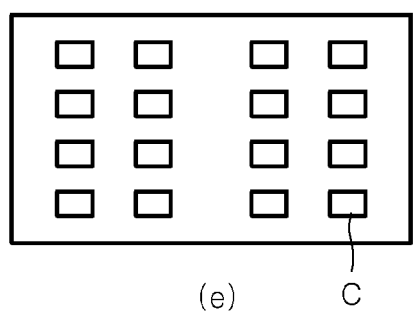
Figure 5:
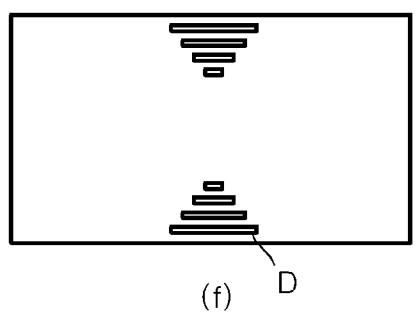

FIG. 5 shows plan views presenting examples of the adhesion control layers (a, b, c, d) applied to the display devices 100, 200, 300 and 400 according to an embodiment of the present invention. Only several examples of the adhesion control layers (a, b, c, d) are shown herein, and the adhesion control layers may be variously modified within the scope of the present invention.

According to FIG. 5, the adhesion control layers (a, b, c, d) utilize patterns of various plan views. Specifically, the patterns include pattern A formed in the shape of a strip extended in the length direction of the adhesive control layers (a, b, c, d), pattern B formed in a shape the same as that of pattern A while having a different adhesive force, pattern C formed in the shape of a single island, pattern D formed in the shape of a plurality of islands, pattern E formed in the shape of expanded pattern C, pattern F formed in a shape the same as that of pattern E while having a different adhesive force, pattern G formed in the shape of a fence, pattern H formed in the shape of a fence while having an adhesive force different from that of pattern G, pattern I arranged at the corners of the adhesive control layer (a, b, c, d), and the like. The examples of the patterns (A to I) utilize the flat layer 20 and the first to third patterns 21, 22 and 23 described above.

The drawings show examples of adhesion control layers (a, b, c, d). The examples of arranging the patterns may be accomplished in a strip shape (a), a grid shape (b), an island shape (a, e, f), a fence shape (c), or a combination of these (c, d). The patterns of the adhesion control layer (a, b, c, d) and arrangement of the patterns are not limited to the examples described above, and those skilled in the art may diversely modify and implement without departing from the gist of the present invention.

While the present invention has been described with reference to the preferred embodiments, the present invention is not limited to the embodiments, and various modifications may be made by those skilled in the art within the scope of the present invention.

The invention claimed is:

1. A display device comprising:
   an adhesive member;
   an adherend member to which the adhesive member is attached;
   a detachable layer positioned on any one among the adhesive member and the adherend member; and
   an adhesion control layer positioned on any one among the adhesive member and the adherend member to detachably attach the detachable layer, wherein
   the adhesion control layer is disposed on one side of any one among the adhesive member and the adherend member, and includes a flat layer covering an entire surface of the one side, and a pattern layer disposed on the flat layer, and adhesive forces of the flat layer and the pattern layer with respect to the detachable layer are different from each other.

2. The device according to claim 1, wherein the adhesive member is at least any one selected among a component constituting the display device and a protective sheet.

3. The device according to claim 1, wherein the adherend member is at least any one selected among a component constituting the display device and a protective sheet.

4. The device according to claim 1, wherein the adherend member has a flat or curved surface or a combination of these.

5. The device according to claim 1, wherein the adherend member is foldable, rollable or flexible.

6. The device according to claim 1, wherein the flat layer and the pattern layer are at least any one among a hard coating layer, a digital printing layer, a coating layer for adjusting a contact angle, a deposition layer, a micro-protrusion layer including micro-protrusions, and a surface modification layer.

7. The device according to claim 1, wherein the pattern layer includes a first pattern exposing the flat layer.

8. The device according to claim 7, wherein the pattern layer includes a second pattern positioned between the first patterns not to be in contact with the first pattern, and adhesive forces of the first and second patterns are different from an adhesive force of the detachable layer by themselves according to their positions.

9. The device according to claim 7, wherein the pattern layer includes a third pattern positioned between the first patterns to be in contact with the first pattern, and adhesive forces of the first and third patterns are different from an adhesive force of the detachable layer by themselves according to their positions.

10. The device according to claim 1, wherein the pattern layer is configured of any one among or a combination of a first pattern exposing the flat layer, a second pattern positioned between the first patterns not to be in contact with the first pattern, and a third pattern positioned between the first patterns to be in contact with the first pattern, and the first to third patterns have an adhesive force different from that of the detachable layer by themselves according to their positions.

11. The device according to claim 1, wherein the pattern layer is formed in a shape of a strip, a grid, an island, a fence, or a combination of these.

12. The device according to claim 1, wherein the pattern layer is a transparent layer, a translucent layer, or a combination of these.

13. The device according to claim 1, wherein the pattern layer is implemented as a character, a logo, a mark, or an image.

14. The device according to claim 1, wherein the detachable layer is a pattern shape configured of an adhesive layer and a cured layer.

15. The device according to claim 1, wherein the detachable layer is formed through any one among coating, sheet, and surface modification.

16. A display device comprising:
an adhesive member;
an adherend member to which the adhesive member is attached;
a detachable layer positioned on any one among the adhesive member and the adherend member; and
an adhesion control layer positioned on any one among the adhesive member and the adherend member to detachably attach the detachable layer, wherein
the adhesion control layer includes a pattern layer disposed on one side of any one among the adhesive member and the adherend member, and adhesive forces of the adherend member and the pattern layer with respect to the detachable layer are different from each other.

17. The device according to claim 16, wherein the adhesive member is at least any one selected among a component constituting the display device and a protective sheet.

18. The device according to claim 16, wherein the adherend member is at least any one selected among a component constituting the display device and a protective sheet.

19. The device according to claim 16, wherein the adherend member has a flat or curved surface or a combination of these.

20. The device according to claim 16, wherein the pattern layer is at least any one among a hard coating layer, a digital printing layer, a coating layer for adjusting a contact angle, a deposition layer, a micro-protrusion layer including micro-protrusions, and a surface modification layer.

21. The device according to claim 16, wherein the pattern layer is configured of any one among or a combination of a first pattern exposing the adherend member, a second pattern positioned between the first patterns not to be in contact with the first pattern, and a third pattern positioned between the first patterns to be in contact with the first pattern, and the first to third patterns have an adhesive force different from that of the detachable layer by themselves according to their positions.

22. The device according to claim 16, wherein the pattern layer is formed in a shape of a strip, a grid, an island, a fence, or a combination of these.

* * * * *